(12) United States Patent
Facemire et al.

(10) Patent No.: US 11,182,535 B2
(45) Date of Patent: *Nov. 23, 2021

(54) CONFIGURING A PAGE FOR DRAG AND DROP ARRANGEMENT OF CONTENT ARTIFACTS IN A PAGE DEVELOPMENT TOOL

(71) Applicant: International Business Machines Corporation, Armonk, NY (US)

(72) Inventors: Michael D. Facemire, Pittsboro, NC (US); Mohamad R. Salahshoor, Raleigh, NC (US); John F. Schumacher, Lexington, MA (US); Michael C. Wanderski, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/560,730

(22) Filed: Sep. 4, 2019

(65) Prior Publication Data

US 2019/0392026 A1    Dec. 26, 2019

Related U.S. Application Data

(63) Continuation of application No. 14/142,376, filed on Dec. 27, 2013, now Pat. No. 10,417,315, which is a
(Continued)

(51) Int. Cl.
*G06F 40/14* (2020.01)
*G06F 16/958* (2019.01)
(Continued)

(52) U.S. Cl.
CPC ............ *G06F 40/14* (2020.01); *G06F 3/0486* (2013.01); *G06F 16/986* (2019.01); *G06F 40/169* (2020.01)

(58) Field of Classification Search
None
See application file for complete search history.

(56) References Cited

U.S. PATENT DOCUMENTS 5,621,878 A    4/1997 Owens
5,845,299 A *  12/1998 Arora ................... G06F 40/117
                                                715/209

(Continued)

OTHER PUBLICATIONS

Mosconi, Mauro, Marco Porta, and Federico Zanetti. "Direct manipulation of pictorial items within web sites: a drag & drop approach to on-line interaction." In Proceedings of the Working Conference on Advanced Visual Interfaces, pp. 115-118. 2002. (Year: 2002).*

(Continued)

*Primary Examiner* — Frank D Mills
(74) *Attorney, Agent, or Firm* — Cuenot, Forsythe & Kim, LLC

(57) ABSTRACT

A method, system and apparatus for configuring a page for drag and drop arrangement of content artifacts can include populating a content artifact registry with a plurality of content artifacts, each of the content artifacts defining a draggable and droppable form of a particular type of page content. The method further can include defining a drop zone within the page to receive a dragged and dropped one of the content artifacts, the drop zone defining a consumable type of page content and an action to undertake when consuming a dropped one of the content artifacts having a particular type of page content consistent with the consumable type of page content.

18 Claims, 2 Drawing Sheets

Related U.S. Application Data continuation of application No. 11/083,913, filed on Mar. 18, 2005, now Pat. No. 8,635,548.

(51) Int. Cl.
*G06F 40/169* (2020.01)
*G06F 3/0486* (2013.01)

(56) References Cited

U.S. PATENT DOCUMENTS

| | | | |
|---|---|---|---|
| 6,275,935 B1 * | 8/2001 | Barlow | G06F 21/6209 |
| | | | 713/155 |
| 6,278,448 B1 | 8/2001 | Brown | |
| 6,492,995 B1 | 12/2002 | Atkin | |
| 6,826,553 B1 | 11/2004 | Dacosta | |
| 7,013,435 B2 | 3/2006 | Gallo | |
| 7,840,905 B1 | 11/2010 | Weber | |
| 8,635,548 B2 | 1/2014 | Facemire | |
| 10,417,315 B2 | 9/2019 | Facemire | |
| 2002/0122054 A1 | 9/2002 | Hind | |
| 2002/0174201 A1 | 11/2002 | Ramer | |
| 2003/0065638 A1 * | 4/2003 | Robert | G06F 40/103 |
| 2003/0167315 A1 | 9/2003 | Chowdhry | |
| 2004/0001094 A1 * | 1/2004 | Unnewehr | G06F 3/0486 |
| | | | 715/769 |
| 2004/0027379 A1 | 2/2004 | Hong | |
| 2004/0088208 A1 * | 5/2004 | Runge | G06Q 10/0633 |
| | | | 705/7.31 |
| 2004/0103364 A1 * | 5/2004 | Dornback | G06F 9/451 |
| | | | 715/201 |
| 2004/0107404 A1 | 6/2004 | Burns | |
| 2004/0123238 A1 * | 6/2004 | Hefetz | G06F 9/451 |
| | | | 715/234 |
| 2004/0123244 A1 * | 6/2004 | Campbell | G06F 40/174 |
| | | | 715/253 |
| 2004/0133660 A1 | 7/2004 | Junghuber | |
| 2004/0168123 A1 | 8/2004 | Lomelin-Stoupignan | |
| 2004/0183831 A1 * | 9/2004 | Ritchy | G06F 8/38 |
| | | | 715/762 |
| 2004/0230557 A1 | 11/2004 | Bales | |
| 2004/0230679 A1 | 11/2004 | Bales | |
| 2004/0230917 A1 | 11/2004 | Bales | |
| 2004/0230947 A1 | 11/2004 | Bales | |
| 2005/0060180 A1 * | 3/2005 | Wood | H04L 67/14 |
| | | | 715/733 |
| 2005/0065913 A1 | 3/2005 | Lillie | |
| 2006/0031775 A1 | 2/2006 | Sattler | |
| 2006/0112340 A1 * | 5/2006 | Mohr | G06F 16/954 |
| | | | 715/733 |
| 2006/0212822 A1 | 9/2006 | Facemire | |
| 2007/0113194 A1 | 5/2007 | Bales | |
| 2007/0266050 A1 * | 11/2007 | Kaandorp | G06F 9/452 |
| 2009/0249232 A1 | 10/2009 | Lundy | |
| 2010/0077336 A1 | 3/2010 | Ording | |
| 2012/0260203 A1 | 10/2012 | Commarford | |
| 2013/0132878 A1 | 5/2013 | Tijssen | |
| 2014/0189492 A1 | 7/2014 | Facemire | |

OTHER PUBLICATIONS

Buyens, J., "Microsoft Office FrontPage 2003 Inside Out," Microsoft Press, Aug. 27, 2003, 36 pg.
U.S. Appl. No. 11/083,913, Non-Final Office Action, dated Sep. 6, 2007, 14 pg.
U.S. Appl. No. 11/083,913, Final Office Action, dated Feb. 14, 2008, 23 pg.
U.S. Appl. No. 11/083,913, Non-Final Office Action, dated Oct. 15, 2008, 26 pg.
U.S. Appl. No. 11/083,913, Non-Final Office Action, dated Mar. 19, 2009, 27 pg.
U.S. Appl. No. 11/083,913, Examiner's Answer to Appeal Brief, Dec. 28, 2009, 48 pg.
U.S. Appl. No. 11/083,913, Decision on Appeal, Apr. 29, 2013, 12 pg.
U.S. Appl. No. 11/083,913, Notice of Allowance, dated Sep. 6, 2013, 16 pg.
U.S. Appl. No. 14/142,376, Non-Final Office Action, dated Jan. 27, 2017, 16 pg.
U.S. Appl. No. 14/142,376, Final Office Action, dated Aug. 3, 2017, 20 pg.
U.S. Appl. No. 14/142,376, Examiner's Answer to Appeal Brief, Mar. 22, 2018, 19 pg.
U.S. Appl. No. 14/142,376, Decision on Appeal, Mar. 4, 2019, 10 pg.
U.S. Appl. No. 14/142,376, Notice of Allowance, dated May 8, 2019, 9 pg.

* cited by examiner

CONFIGURING A PAGE FOR DRAG AND DROP ARRANGEMENT OF CONTENT ARTIFACTS IN A PAGE DEVELOPMENT TOOL

CROSS-REFERENCE TO RELATED APPLICATIONS

This application is a Continuation of U.S. application Ser. No. 11/083,913, filed on Mar. 18, 2005.

BACKGROUND OF THE INVENTION

Statement of the Technical Field

The present invention relates to the development of network distributable markup and more particularly to the contextual assembly of markup artifacts in a network distributable page.

DESCRIPTION OF THE RELATED ARTS

Prior to the popularization of the Internet and the subsequent implementation of the World Wide Web ("the Web"), software publishers typically distributed computer applications and application content via storage media such as a computer diskette or compact disc. Recently, given the popularization of global computer communications networks, such as the Internet, and overlying content distribution protocols such as embodied by the Web, computer applications and application content are distributed sets of documents and document fragments which can be rendered within hypermedia content browsers such as Web browsers.

In the case of Web distributed content, users can interact with the content not through a traditional graphical user interface ("GUI"), but through a GUI provided by GUI elements embedded in markup rendered in a content browser. Content browsers process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup.

Web pages have evolved in content from simply arranged documents to interactive Web-based applications involving both client-side and server-side logic. As information and applications have proliferated about wide-spanning networks, portals have emerged to help consolidate information and applications and to provide a consistent user interface for the enterprise. Now "workplaces" seem to be the next evolutionary step content and applications distribution, adding a new level of intra-domain collaboration and personalization, and enabling all users to become creators and managers of network distributable content applications.

The evolution of network distributable content production tools has tracked the corresponding advancement of content distribution technologies. Initially limited to static content templates, production tools now resemble advanced integrated development environments which are more familiar to developers of conventional, stand-alone applications. Specifically, modern content production tools utilize a combination of embedded content browser technologies including confined componentry as well as script-driven technology integrated directly within markup. Recently content browsers have enriched scripting to provide a closer level of desktop-like interaction, including the ability to drag content through the movement and transparency of Web artifacts within a page. The availability of these new scripting features gives Web applications the opportunity to provide a new level of seamless interaction with end users while maintaining the intrinsic relationship with page content, not easily achieved with the other technologies.

SUMMARY OF THE INVENTION

The present invention addresses the deficiencies of the art in respect to workplace assembly and provides a novel and non-obvious method, system and apparatus for configuring a page for drag and drop arrangement of content artifacts. Specifically, in a page development tool, a method for configuring a page for drag and drop arrangement of content artifacts can include populating a content artifact registry with a plurality of content artifacts, each of the content artifacts defining a draggable and droppable form of a particular type of page content. The method further can include defining a drop zone within the page to receive a dragged and dropped one of the content artifacts, the drop zone defining a consumable type of page content and an action to undertake when consuming a dropped one of the content artifacts having a particular type of page content consistent with the consumable type of page content.

The populating step can include explicitly expressing a content artifact, the explicit expression including a draggable and droppable form of a particular type of page content and a plurality of content artifact parameters for the page content artifact, and populating the content artifact registry with the explicitly expressed content artifact. The populating step also can include extricating content from the page, inferring a content artifact from the extricated content along with corresponding artifact parameters, and populating the content artifact registry with the inferred content artifact.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for the configuration of a contextual workplace by way of the expression and inferred extrication of content artifacts for use in the contextual workplace. In accordance with the present invention, one or more consumable content artifacts can be defined for inclusion in a controls registry. The consumable content artifacts can be defined through an explicit expression of the content artifacts, or the content artifacts can be inferred through by extrication from existing content. In either case, a drop zone within a page can be declared in which the consumable content artifacts in the controls registry can be dropped in a drag-and-drop operation. In this way, a contextual workplace can be created dynamically using the familiar drag-and-drop paradigm, even by one having little understanding of workplace development.

Figure 1:
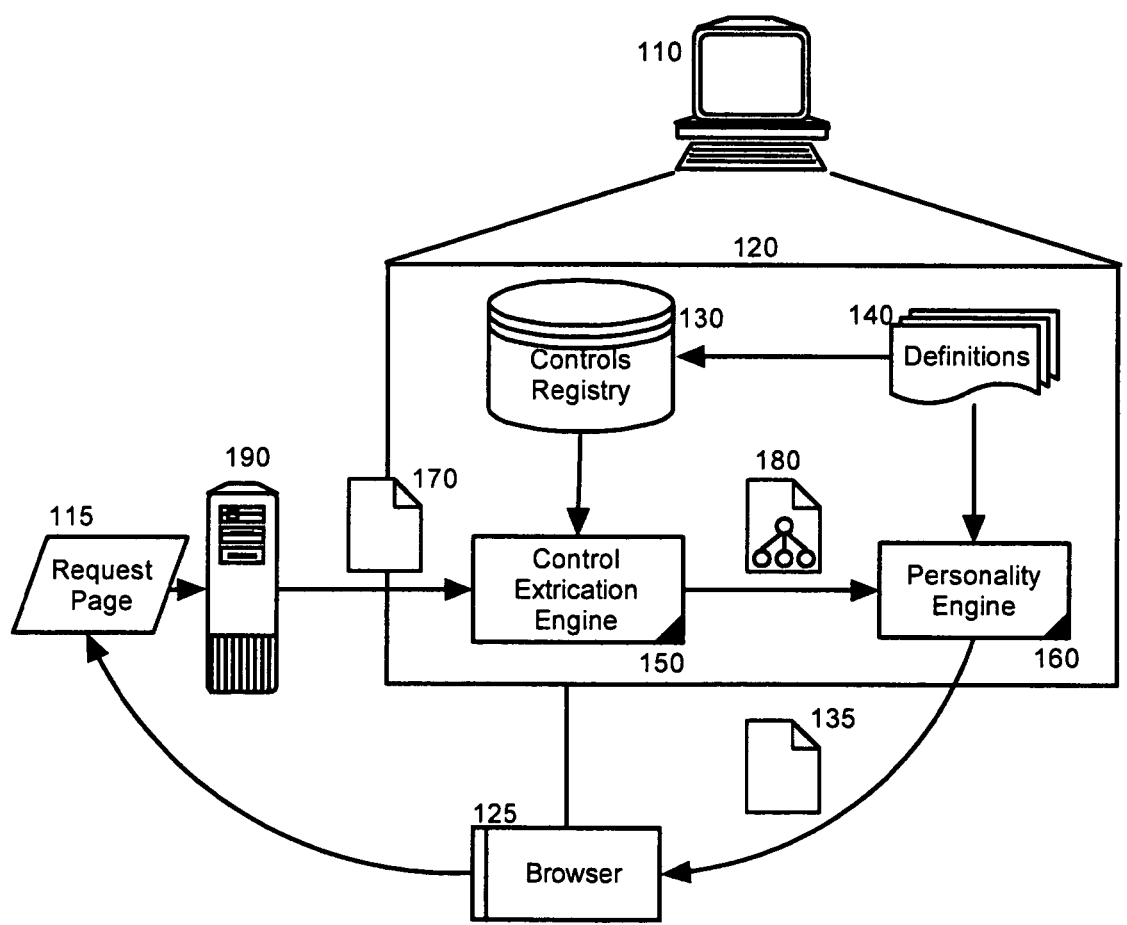
FIG. 1 is a schematic illustration of a system for configuring a page for drag and drop arrangement of content artifacts; and, FIG. 2 is a flow chart illustrating a process for configuring a page to enable the dragging and dropping of content artifacts expressed and extracted in FIG. 1 in order to produce a contextual workplace.

In more particular illustration, FIG. 1 is a schematic illustration of a system configured for the expression and inferred extrication of content artifacts for use in a contextual workplace. The system can include a development platform 120 disposed within a host computing platform 110. The development platform 120 can include a plurality of defined consumable content artifacts 140 included within a controls registry 130. The artifacts 140 can be defined explicitly by way of a definitive expression which can include a control type and one or more parameters wrapped about underlying content such that the underlying content can be placed in a drop zone in an autonomous page portion, such as a portlet, wherein the drop zone shares the same type as the artifact.

The artifacts 140 further can be inferred by extricating underlying content from existing static page markup 160. In this regard, static page markup 160 provided by a content server 150 can be parsed by a control extrication engine 170 and organized in a document object model ("DOM") tree 180. Pattern matching can be applied to the artifacts of the DOM tree 180 to locate content of interest. Subsequently, the located content can be assigned a content type along with associated parameters to enable the located content to be consumed in a drag-and-drop operation.

Figure 2:
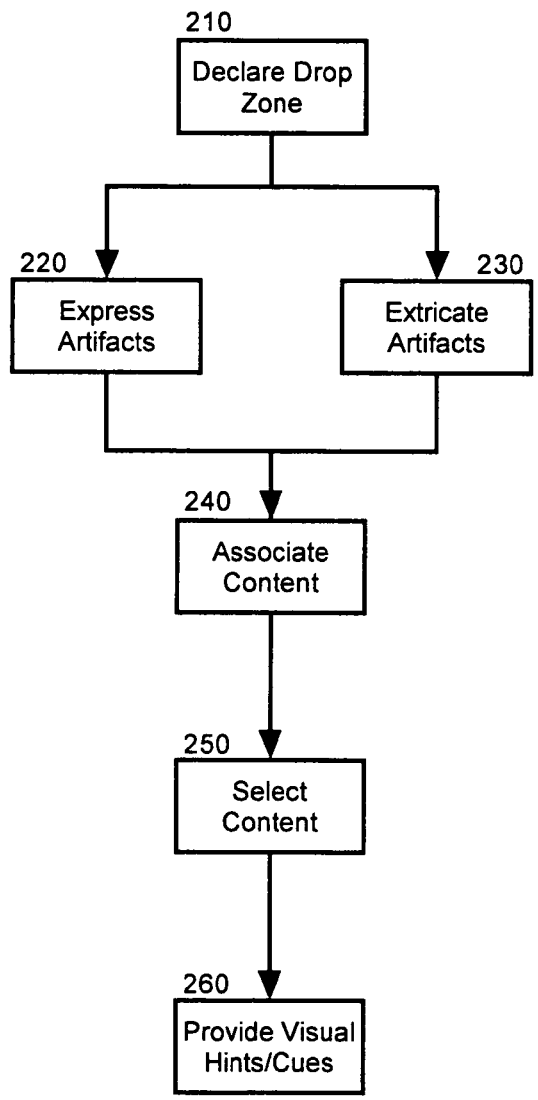

To achieve dynamic content construction in a workplace, in a particular aspect of the present invention, a process can be undertaken to enable a page for dynamic, inline assembly of content artifacts using a drag and drop interface. More particularly, FIG. 2 is a flow chart illustrating a process for configuring a page to enable the dragging and dropping of content artifacts expressed and extracted in FIG. 1 in order to produce a contextual workplace. Referring to FIG. 2, beginning in block 210, one or more drop zones can be declared within a page under construction, for example within portlets in a portal page.

More specifically, through a tag library a drop zone can be declared in a portion of the page such as a portlet, which can consume a content artifact or content object. An exemplary drop zone declaration for a collection field can be specified as follows:

```
<dnd:drop type="html:text, collection: field"
    action="portletAction" style="css:dropStyle:10px">
    <dnd:param name="position" value="1"/>
    <p> Drop Content Here </p>
<dnd:drop>
```

A drop zone can include a specification of an action to be taken by the consuming component—the portlet, for instance—when receiving a dropped content artifact. A style and proximity further can be specified and can refer to a style sheet class to be applied to the consuming component to visually highlight the drop zone when a content artifact is dragged on or near the drop zone. A type attribute yet further can be provided to indicate what artifact types are accepted in the drop zone which can cause the drop zone to become visually highlighted. Types can be scoped by a namespace and are used to store content artifacts in a registry of content artifacts globally used for the construction of a contextual workplace.

Once the drop zone has been configured, when a content artifact of compatible type has been released upon the drop zone, the page containing the portion defining the drop zone can be refreshed with a reference such as a uniform resource locator which has been generated to incorporate (1) the artifact type dropped, (2) the action to cause when dropped, and (3) the specified parameters. The result of this action calls the component controller with the parameters specified, and causes the consumer to take the appropriate action. Then the page can be refreshed so that the results of the action can be expressed.

Referring once again to FIG. 2, in blocks 220 and 230, content artifacts can be configured for consumption by an autonomous page portion such as a portlet which has defined therein a drop zone. In regard to the former, the content artifacts can be expressed directly and stored in a content artifact registry for drag and drop usage during the composition of a contextual workspace, such as a portal page. In regard to the latter, the content artifacts can be inferred from an extrication of content disposed in an existing, static page.

More specifically, in reference to block 220, consumable content artifacts can be explicitly defined through a tag library surrounding a section of markup. The consumable content artifacts can be accompanied by parameters to fully express the definition of that content, thus programmatically creating an object that is fully declarative and consumable by a drop zone. The following fragment illustrates an explicitly defined consumable content artifact:

```
<dnd:drag type="collection: field">
    <dnd:param name="type" value="TYPETEXTV>
    <dnd:param name="name" value="FieldName"/>
    <dnd:param name="defaultValue" value="FieldValue"/>
    <table bgcolor="#FF0000" width="100%"><tr>
        <td align="left">Field Name</td>
        <td align="right">Field Description</td>
    <tr></table>
</dnd:drag>
```

Within a development tool, when rendering a page configured with drop zones able to receive the consumable content artifact, scripting necessary to accomplish dragging the artifact can be inserted about the content and the parameters can be kept within the artifact with request scope to associate the artifacts with all available drop zones in the page rendered in the development tool.

As an alternative, a content artifact can be expressed explicitly based upon an existing artifact in a page. In this regard, sections of markup in a page can be selected as the content definition for an existing artifact in the page. Subsequently, a prompt can be generated in which expression parameters can be added, such as the content type. Finally, the newly expressed content artifact can be added to the content artifact registry as an artifact available for dragging and dropping into a drop zone.

By comparison to the explicit expression of a consumable content artifact, in block 230 consumable content artifacts further can be inferred through an extrication from existing static content. In particular, in a preferred aspect of the invention, content in a static page can be analyzed for distinct patterns related to consumption. Pattern matching examples can include an image tag, a list of items tag, a form tag, and the like. Additional pattern types can be inserted in the content artifact registry through a pattern matching scheme such as that provided by transformation scripts. In any case, the tag attributes of the content can be yet further analyzed to identify parameters for inclusion in the draggable form of the consumable content artifact. As an example, the content <img src="image.gif" alt="text" border="0"/> can be analyzed to extract location, text and border parameters.

In block 240, the inferred content artifact can be associated with existing content artifacts in the content artifact registry in order to further parameterize the inferred content artifact. Specifically, in addition to automatically inferring simple parameters from the content of the inferred content artifact, parameters can be inserted by locating a matching content artifact in the content artifact registry. Subsequently, the parameter names of the matching content artifact can be translated in the content artifact registry with content artifact attribute type definitions for the inferred content artifact.

For new, unrecognized artifact definitions, an interface can be presented to selectively enable the parameters of the inferred content artifact to map to existing parameters, or to create additional parameters. The new artifact definition subsequently can be stored in the content artifact registry and applied to subsequent content artifacts matching the same pattern.

It will be recognized by the skilled artisan that content artifacts can be of a wide variety such that if left unchecked, the process of assembling the page through a selection of content artifacts in the content artifact registry can become unwieldy and cumbersome. Accordingly, in block 250, only selected content artifacts in the content artifact registry can be presented for use in assembling the page. Specifically, the content artifacts in the content artifact registry can be selected according to the context of the page under construction. For instance, to the extent that the page is an image portlet, only image content artifacts need be highlighted for use in a drag and drop operation. To facilitate the contextual selection of content artifacts, different pages can include corresponding context types which can be stored in a registry of types. In this way, the context of a page can be readily ascertained by reference to the registry of types.

Finally, in block 260, the theme of the page can be augmented with visual cues to highlight actions that can be taken with expressed and extricated content. For example, drop zones in the page can be visually highlighted based upon the style properties associated with the content type of the drop zones and a dragged one of the content artifacts. If the content has been extricated, the content artifact type can be used to locate the type of style to use from the content artifact registry. Manageable content artifacts can be highlighted within a page by providing a colored border or the specified styling.

When a content artifact is dragged, the content artifact can become translucent and all of the associated drop zones of the same type can be highlighted by their indicated styling. Additionally, using script layering and floating objects, "connectors" can be shown to indicate options, such as a line between the dragged content artifact and all available drop zones. The changes in style can be accomplished by injecting styling script in the page as part of the applied page theme. These visual cues aid in enabling dynamic content assembly and make the drag and drop interface efficient and more visually usable.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-implemented method for configuring a page within a page development tool including a registry with a plurality of content artifacts, comprising:
   declaring, using the page development tool, a plurality of style-specific drop zones within the page;
   comparing a type of a selected one of the content artifacts to a type of one of the style-specific drop zones;
   receiving, within the one of the plurality of style-specific drop zones and by a drag and drop operation, the selected one of the content artifacts; and
   performing on the received one of the content artifacts, by the page development tool and based upon the type of the received one of the content artifacts matching the type of the one of the plurality of style-specific drop zones, an action specified by the one of the plurality of style-specific drop zones, wherein
   each drop zone separately defines a type of page content and the action to undertake upon receiving a dragged and dropped one of the content artifacts, and
   the performing the action applies a display style to the received one of the content artifacts.

2. The method of claim 1, wherein
   the registry includes content artifacts each explicitly expressed using a definitive expression including a control type and at least one parameter.

3. The method of claim 1, wherein
   visual connectors are provided, by the page development tool, between the selected one of the content artifacts being dragged and each of a plurality of style-specific drop zones that corresponds to the type of the selected one of the content artifacts.

4. The method of claim 1, wherein
   the registry is populated by:
   extricating content from existing static content with the page; and
   inferring a content artifact from the extricated content.

5. The method of claim 4, wherein
the inferring the content artifact includes inferring corresponding artifact parameters.

6. The method of claim 1, wherein
a style is defined for the one of the plurality of style-specific drop zones,
the one of the plurality of style-specific drop zones is highlighted using the style based upon the selected content artifact having a type of page content consistent with a type of page content defined for the one of the plurality of style-specific drop zones.

7. A computer hardware system adapted to configure a page within a page development tool including a registry with a plurality of content artifacts, comprising:
a processor configured to initiate the following executable operations:
declaring, using the page development tool, a plurality of style-specific drop zones within the page;
comparing a type of a selected one of the content artifacts to a type of one of the style-specific drop zones;
receiving, within the one of the plurality of style-specific drop zones and by a drag and drop operation, the selected one of the content artifacts; and
performing on the received one of the content artifacts, by the page development tool and based upon the type of the received one of the content artifacts matching the type of the one of the plurality of style-specific drop zones, an action specified by the one of the plurality of style-specific drop zones, wherein
each drop zone separately defines a type of page content and the action to undertake upon receiving a dragged and dropped one of the content artifacts, and
the performing the action applies a display style to the received one of the content artifacts.

8. The system of claim 7, wherein
the registry includes content artifacts each explicitly expressed using a definitive expression including a control type and at least one parameter.

9. The system of claim 7, wherein
visual connectors are provided, by the page development tool, between the selected one of the content artifacts being dragged and each of a plurality of style-specific drop zones that corresponds to the type of the selected one of the content artifacts.

10. The system of claim 7, wherein
the registry is populated by:
extricating content from existing static content with the page; and
inferring a content artifact from the extricated content.

11. The system of claim 10, wherein
the inferring the content artifact includes inferring corresponding artifact parameters.

12. The system of claim 7, wherein
a style is defined for the one of the plurality of style-specific drop zones,
the one of the plurality of style-specific drop zones is highlighted using the style based upon the selected content artifact having a type of page content consistent with a type of page content defined for the one of the plurality of style-specific drop zones.

13. A computer program product, comprising:
a hardware storage device having stored therein a computer program for configuring a page within a page development tool including a registry with a plurality of content artifacts,
the computer program comprising a routine set of instructions which when executed by a computer hardware system, causes the computer hardware system to perform:
declaring, using the page development tool, a plurality of style-specific drop zones within the page;
comparing a type of a selected one of the content artifacts to a type of one of the style-specific drop zones;
receiving, within the one of the plurality of style-specific drop zones and by a drag and drop operation, the selected one of the content artifacts; and
performing on the received one of the content artifacts, by the page development tool and based upon the type of the received one of the content artifacts matching the type of the one of the plurality of style-specific drop zones, an action specified by the one of the plurality of style-specific drop zones, wherein
each drop zone separately defines a type of page content and the action to undertake upon receiving a dragged and dropped one of the content artifacts, and
the performing the action applies a display style to the received one of the content artifacts.

14. The computer program product of claim 13, wherein
the registry includes content artifacts each explicitly expressed using a definitive expression including a control type and at least one parameter.

15. The computer program product of claim 13, wherein
visual connectors are provided, by the page development tool, between the selected one of the content artifacts being dragged and each of a plurality of style-specific drop zones that corresponds to the type of the selected one of the content artifacts.

16. The computer program product of claim 13, wherein
the registry is populated by:
extricating content from existing static content with the page; and
inferring a content artifact from the extricated content.

17. The computer program product of claim 16, wherein
the inferring the content artifact includes inferring corresponding artifact parameters.

18. The computer program product of claim 13, wherein
a style is defined for the one of the plurality of style-specific drop zones,
the one of the plurality of style-specific drop zones is highlighted using the style based upon the selected content artifact having a type of page content consistent with a type of page content defined for the one of the plurality of style-specific drop zones.

* * * * *